US008255886B2

(12) United States Patent
Lachner

(10) Patent No.: US 8,255,886 B2
(45) Date of Patent: Aug. 28, 2012

(54) METHODS AND APPARATUS FOR ANALYZING SIMD CODE

(75) Inventor: Peter Lachner, Heroldstatt (DE)

(73) Assignee: Intel Corporation, Santa Clara, CA (US)

(*) Notice: Subject to any disclaimer, the term of this patent is extended or adjusted under 35 U.S.C. 154(b) by 1094 days.

(21) Appl. No.: 12/215,857

(22) Filed: Jun. 30, 2008

(65) Prior Publication Data

US 2009/0327937 A1    Dec. 31, 2009

(51) Int. Cl.
*G06F 9/45* (2006.01)

(52) U.S. Cl. ........ 717/136; 717/139; 717/137; 717/105; 717/109; 712/20; 712/22

(58) Field of Classification Search .................. 717/136, 717/139, 140
See application file for complete search history.

(56) References Cited

U.S. PATENT DOCUMENTS

| | | | | |
|---|---|---|---|---|
| 5,197,140 A * | 3/1993 | Balmer | ........................ | 711/220 |
| 5,239,654 A * | 8/1993 | Ing-Simmons et al. | ........ | 712/20 |
| 5,274,818 A * | 12/1993 | Vasilevsky et al. | ........... | 717/149 |
| 5,371,896 A * | 12/1994 | Gove et al. | ....................... | 712/20 |
| 5,511,212 A * | 4/1996 | Rockoff | .......................... | 712/22 |
| 5,522,083 A * | 5/1996 | Gove et al. | ....................... | 712/22 |
| 5,542,074 A * | 7/1996 | Kim et al. | ........................ | 712/22 |
| 6,167,501 A * | 12/2000 | Barry et al. | ....................... | 712/11 |
| 6,185,667 B1 * | 2/2001 | Abercrombie et al. | ......... | 712/11 |
| 6,212,628 B1 * | 4/2001 | Abercrombie et al. | ....... | 712/226 |
| 7,039,906 B1 * | 5/2006 | Trelewicz et al. | ............. | 717/149 |
| 7,814,486 B2 * | 10/2010 | Papakipos et al. | ............ | 718/100 |
| 7,818,548 B2 * | 10/2010 | Hansen et al. | ................. | 712/222 |
| 8,010,953 B2 * | 8/2011 | Gschwind | ..................... | 712/149 |
| 8,136,104 B2 * | 3/2012 | Papakipos et al. | ............ | 717/146 |
| 8,146,066 B2 * | 3/2012 | Demetriou et al. | ........... | 717/149 |
| 2004/0025150 A1 * | 2/2004 | Heishi et al. | .................. | 717/154 |
| 2004/0098709 A1 * | 5/2004 | Kyo | ............................. | 717/140 |
| 2005/0246698 A1 * | 11/2005 | Chung | .......................... | 717/151 |
| 2007/0233766 A1 * | 10/2007 | Gschwind | ..................... | 708/490 |
| 2007/0294512 A1 * | 12/2007 | Crutchfield et al. | .......... | 712/200 |
| 2007/0294663 A1 * | 12/2007 | McGuire et al. | .............. | 717/108 |
| 2007/0294680 A1 * | 12/2007 | Papakipos et al. | ............ | 717/149 |
| 2007/0294681 A1 * | 12/2007 | Tuck et al. | ..................... | 717/149 |

(Continued)

OTHER PUBLICATIONS

Title: A framework for dynamic visualisation in simulation based instructional training, author: Helfesrieder, B et al, soource: IEEE, 1998.*
Title: Optimizing dynamic binary translation for SIMD instructions, Jianhui Li source: IEEE, dated: 2006.*
Rational Rose RealTime—Accelerating Embedded e-development, 2000, 3 pages, Rational Software, Cupertino, CA.

(Continued)

*Primary Examiner* — Chameli Das
(74) *Attorney, Agent, or Firm* — Schwabe, Williamson & Wyatt, P.C.

(57) ABSTRACT

A method for analyzing and presenting in a graphical manner single instruction, multiple data (SIMD) instructions involves disassembling a stream of machine instructions into a stream of assembly language instructions. Instruction objects "M" and "N" are created to represent SIMD instructions "M" and "N" from the stream of instructions. Instruction objects "M" and "N" include multiple data objects corresponding to the multiple data items of the respective SIMD instruction. Different colors are assigned to at least two of the multiple data objects of instruction object "M." If a data item of SIMD instruction "N" is based on a data item of SIMD instruction "M," the color from the source object is automatically assigned to the target object. Dependencies between data items of instruction "M" and "N" are annotated by arrows between corresponding data objects. Other embodiments are described and claimed.

28 Claims, 5 Drawing Sheets

U.S. PATENT DOCUMENTS

2007/0294696 A1* 12/2007 Papakipos et al. ............ 718/102
2008/0005547 A1*  1/2008 Papakipos et al. ............ 712/244
2010/0199257 A1*  8/2010 Biggerstaff ................... 717/104
2011/0010715 A1*  1/2011 Papakipos et al. ............ 718/100

OTHER PUBLICATIONS

Intel® 64 and IA-32 Architectures—Software Developer's Manual, vol. 1: Basic Architecture, Nov. 2006, 468 pages.

* cited by examiner

METHODS AND APPARATUS FOR ANALYZING SIMD CODE

FIELD OF THE INVENTION

The present disclosure relates generally to the field of data processing, and more particularly to methods and related apparatus for analyzing code that involves single instruction, multiple data (SIMD) instructions.

BACKGROUND

A data processing system may include hardware resources, such as one or more processors, random access memory (RAM), read-only memory (ROM), etc. A processor may include multiple processing units. The processing system may also include software resources, such as a basic input/output system (BIOS), an operating system (OS), and various applications.

A processor may provide hardware support for processing vectors. A vector is a data structure that holds a number of consecutive elements or data items. A vector register of size M may contain N vector elements of size O, where N=M/O. For instance, a 64-byte vector register may be partitioned into (a) 64 vector elements, with each element holding a data item that occupies 1 byte, (b) 32 vector elements to hold data items that occupy 2 bytes (or one "word") each, (c) 16 vector elements to hold data items that occupy 4 bytes (or one "doubleword") each, or (d) 8 vector elements to hold data items that occupy 8 bytes (or one "quadword") each.

A processor may support SIMD operations, to provide data level parallelism. SIMD operations typically involve application of the same operation to multiple data items. For instance, in response to a single SIMD add instruction, a processor may add a specified value to each element in a vector.

As advances are made in processor design and manufacture, more powerful and more complex SIMD instructions become available. It therefore gets harder and harder for programmers to fully understand all of the latest SIMD instructions. It can therefore be difficult for programmers to debug code that uses complex sequences of SIMD instructions.

For instance, a more or less conventional disassembler function may be used to extract SIMD instructions from machine code that is being executed by a processor, but a typical disassembler function only provides a textual view of the instruction stream. By contrast, a training manual may include illustrations of various SIMD instructions, and each illustration may show how one SIMD instruction uses source operands and target operands. However, such illustrations do not show how different SIMD instructions within a particular program relate to each other.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
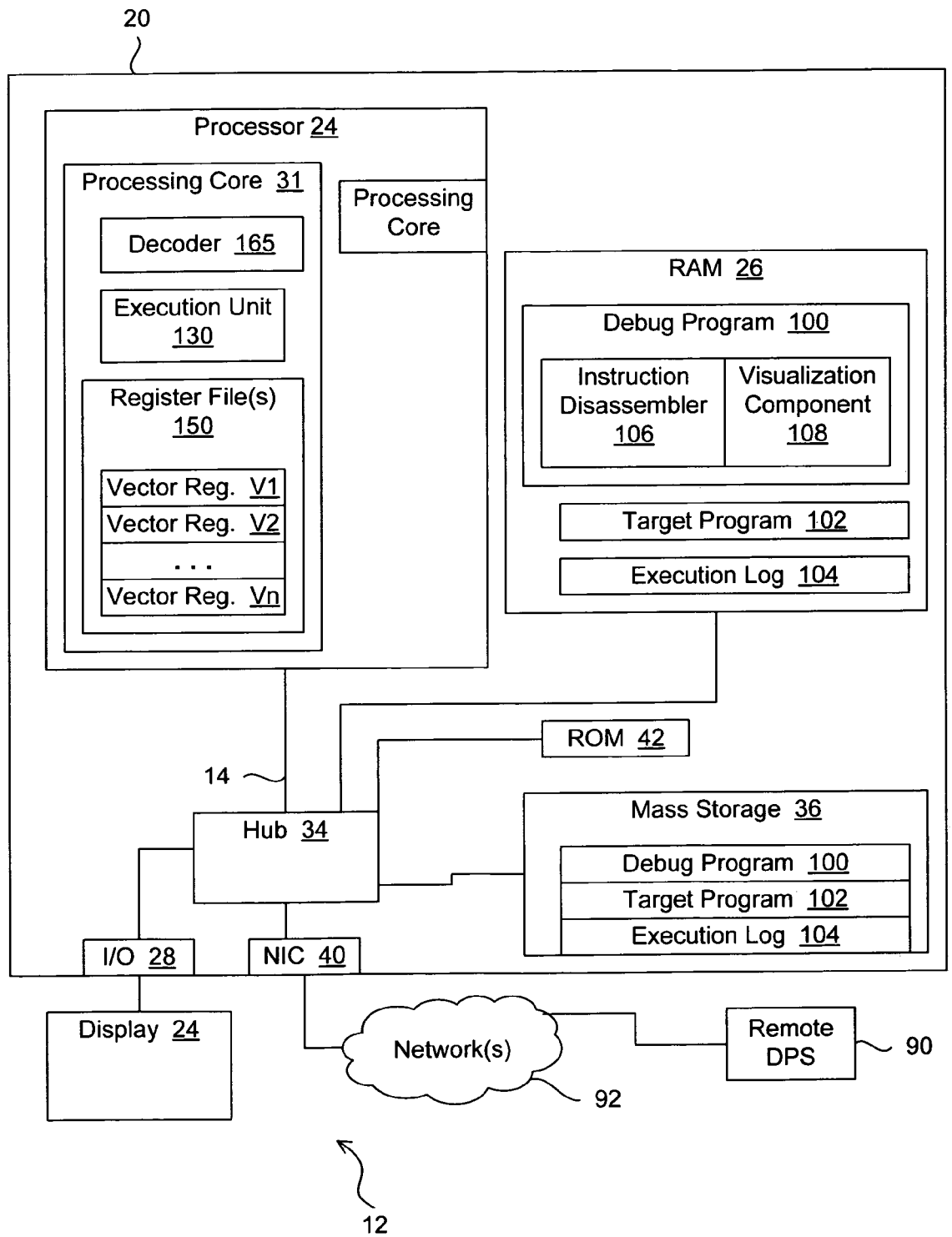
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that has various hardware and software components. The hardware components include a processor 22, which includes at least one processing unit or processing core 31. Processing units may be implemented as Hyper-Threading (HT) technology, or as any other suitable technology for executing multiple threads or instructions simultaneously or substantially simultaneously.

In the embodiment of FIG. 1, processor 22 operates as a central processing unit (CPU). In addition, processor 22 supports SIMD operations. For example, processing core 31 may include an execution unit 130, and instruction decoder 165, and one or more registers or register files, such as a register file 150 with "n" vector registers, V1 . . . Vn. Processor 22 may use instruction decoder 165 to decode machine instructions, including SIMD instructions, into micro-operations.

Processing system 20 may also include other hardware components, which may be communicatively coupled via one or more system buses 14 or other communication pathways or mediums. This disclosure uses the term "bus" to refer to shared (e.g., multi-drop) communication pathways, as well as point-to-point pathways, interconnect rings, etc. Processing system 20 may include a chipset with one or more hubs 34 that serve to interconnect various hardware components. In the embodiment of FIG. 1, processing system 20 includes one or more volatile or non-volatile data storage devices, such as RAM 26, ROM 42, mass storage devices 36 such as hard drives, and/or other devices or media, such as floppy disks, optical storage, tapes, flash memory, memory sticks, digital versatile disks (DVDs), etc. For purposes of this disclosure, the terms "read-only memory" and "ROM" may be used in general to refer to non-volatile memory devices such as erasable programmable ROM (EPROM), electrically erasable programmable ROM (EEPROM), flash ROM, flash memory, etc. Processor 24 may also be communicatively coupled to additional components, such as integrated drive electronics (IDE) controllers, small computer system interface (SCSI) controllers, universal serial bus (USB) controllers, input/output (I/O) ports, etc. The I/O ports may enable processor 24 to communicate with external devices. For instance, I/O port 28 may be a display adapter for communicating with a display 24. Similarly, I/O ports may enable processor 24 to receive user input from input devices such as a keyboard, a pointing device, a touch screen, etc.

Processing system 20 may be controlled, at least in part, by input from input devices and/or by directives received from another machine. Processing system 20 may utilize one or more connections to one or more remote data processing systems 90, such as through a network interface controller (NIC) 40, a modem, or other communication ports or couplings. Processing systems may be interconnected by way of a physical and/or logical network 92, such as a local area network (LAN), a wide area network (WAN), an intranet, the Internet, etc. Communications involving network 92 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available from the Internet at grouper.ieee.org/groups/802/16/published.html.

The invention may be described herein with reference to data such as instructions, functions, procedures, data structures, application programs, configuration settings, etc. When the data is accessed by a machine, the machine may respond by performing tasks, defining abstract data types, establishing low-level hardware contexts, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. The term "program" may also be used to refer to a set of one or more instructions resulting from processes such as translation, interpretation, compilation, linking, etc. Thus, the term "program" may be used to refer to any collection of instructions which, when executed by a processing system, performs a desired operation or operations.

In the embodiment of FIG. 1, processing system 20 also includes various software resources. For instance, ROM 42 contains a BIOS, and mass storage device 36 contains an OS, a debug program 100, and a target program 102. Processing system 20 may copy the programs into RAM 26 and then execute them. In the embodiment of FIG. 1, target program 102 is the program to be analyzed, and debug program 100 is the program that is used to analyze target program 102. For instance, target program 102 may include code under development, and the programmer may use debug program 100 to analyze the code he is developing. For example, the programmer may determine that target program 102 is producing an incorrect result, and the programmer may use debug program 100 to determine why incorrect results are being produced.

In addition, processing system 20 may keep an execution log 104 that contains (a) the instructions executed by processor 22, and (b) the data manipulated by those instructions.

As indicated above, a user (e.g., a programmer) may use debug program 100 to analyze target program 102, and target program 102 may include SIMD instructions. In one embodiment, debug program 100 supports both dynamic analysis and historic analysis. That is, debug program 100 may generate and display analysis results as target program 102 is executing. Debug program 100 may also generate and display analysis results based on a past execution of target program 102, as recorded in execution log 104.

This disclosure describes a new method to portray sequences of related SIMD instructions. The control logic for implementing this method may be referred to as a visual disassembler. For instance, instruction disassembler 106 and visualization component 108 together may be referred to as a visual disassembler.

As described in greater detail below, debug program 100 may supply a visual description of what a particular SIMD instruction does, including actual context information of the application (e.g., target program 102) which uses that SIMD instruction. This context information is important, since the behavior of many such instructions or functions depends on information computed during runtime. Debug program 100 may also show how the different sub-elements of an operand (e.g., the elements of a vector) are accessed and used.

Thus, the output generated by debug program 100 may clarify the relationships between the SIMD instructions within target program 102, including the relationships between the various operands. For instance, debug program 100 may display various graphical objects which illustrate the complex operations performed by the SIMD instructions. These graphical objects may provide an instantly recognizable illustration of the links between the executed instructions and the effects of those instructions on processor registers and memory locations.

Debug program 100 may also allow the user to select an operand of interest in one SIMD instruction, and in response to such a selection, debug program 100 may highlight operands from other SIMD instructions that affect, or are affected, by the selected operand. An operand that affects another operand may be said to feed in to that other operand. For purposes of this disclosure, operands may also be referred to as data items.

In one embodiment, debug program 100 has two main components: the instruction disassembler 106 and the visualization component 108. Instruction disassembler 106 may read a stream of bytes, from (a) the code segment of an executable image, (b) the code memory from the target system, or (c) the collected execution log. Instruction disassembler 106 may extract machine instructions from the stream, and instruction disassembler 106 may decode those machine instructions into corresponding assembly instructions, according to an instruction set architecture (ISA) selected by the user. Instead of, or in addition to, creating a textual assembler-style listing shown the mnemonic and the instruction parameters, debug program 100 may create a linked list of instruction objects. As explained in greater detail below, visualization component 108 may interpret the list of instruction objects and present a corresponding list of graphical objects or symbols on an output device. Alternatively, visualization component 108 may analyze and augment the instructions objects created by instruction disassembler 106, and visualization component 108 may display those augmented instruction objects.

Visualization component 108 may also contain an interface to a master application (e.g., a separate debugging program), for instance via an application program interface (API), such as a Windows interface, an Eclipse RCP interface, etc. Such an interface may allow debug program 100 to be plugged into the Intel® Debugger, or into other debuggers like Visual Studio®, etc.

In the embodiment of FIG. 1, when analyzing a code sequence, visualization component 108 generates, for each opcode, a graphical object to show the functionality of that opcode. That graphical object may be referred to as an instruction object. In addition, visualization component 108 may create a diagram similar to a data-flow diagram, with the instruction objects linked in the diagram to highlight the relationships between the instructions.

The example code sequence below shows a set of streaming SIMD extensions 3 (SSE3) instructions to code a vector length 4 dot product.

```
mov     eax, dword ptr [source_ptr]
mov     ecx, dword ptr [destination_ptr]
```

```
        mov     edx, loop_count
loop_start:
        movaps  xmm0, [eax]
        mulps   xmm0, [eax+16]
        haddps  xmm0, xmm0
        movaps  xmm1, xmm0
        psrlq   xmm0, 8
        addss   xmm0, xmm1
        movss   [ecx], xmm0
        add     eax, 32
        add     ecx, 4
        sub     edx, 1
        jnz     loop_start
```

Figure 2:
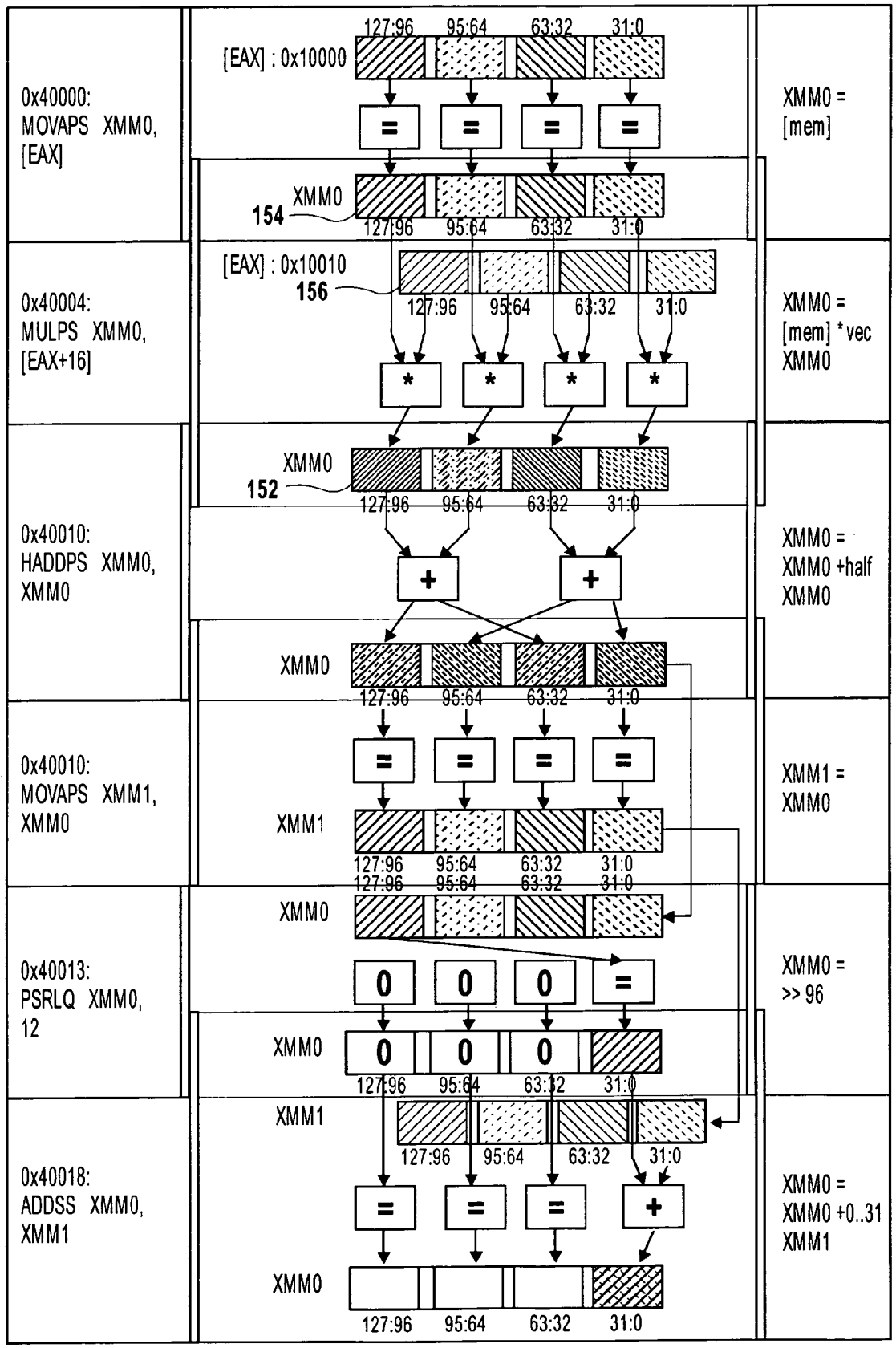
FIGS. 2 and 3 are diagrams depicting example presentations in a user interface, according to example embodiments of the present invention.

If a user were to select the six instructions shown in bold in the code sequence above, debug program 100 could generate the output depicted in FIG. 2. The user may select the desired instruction via disassembler views of debug program 100, for instance.

FIG. 2 is a diagram depicting an example presentation to be displayed in a user interface by debug program 100. Such a user interface may be generated to show SIMD instructions executed from target program 102, and to clarify the relationships between those instructions. In particular, FIG. 2 illustrates the relationships between the six SIMD instructions from target program 102 that are listed in bold above.

Each of those of six instructions is depicted in one of the six rows shown in FIG. 2. FIG. 2 also has three columns. The first column on the left shows the instructions, including the instruction address and the operands. A second or middle column provides the graphical representation of the operands and the operation. This graphical representation may be referred to as an instruction object. The third column shows a simplified textual description of the operation.

For instance, the second row represents the second instruction highlighted in bold above (i.e., "mulps xmm0, [eax+16]"), where "mulps" is the opcode, "xmm0" serves as both a source and a target register, and "[eax+16]" is a source memory address.

The middle column of that row shows the instruction object generated by visualization component 108 for that instruction. In particular, that instruction object includes two sets of source operand objects at the top, a set of operator objects towards the middle, and a set of target operand objects at the bottom. Visualization component 108 displays arrows connecting source operand objects to corresponding operator objects, as well as arrows connecting operator objects to corresponding target operand objects, to illustrate relationships between those objects. Visualization component 108 also automatically assigns different colors to different operand objects to further illustrate the relationships between those objects. For purposes of this disclosure, operand objects may also be referred to as data objects.

Figure 3:
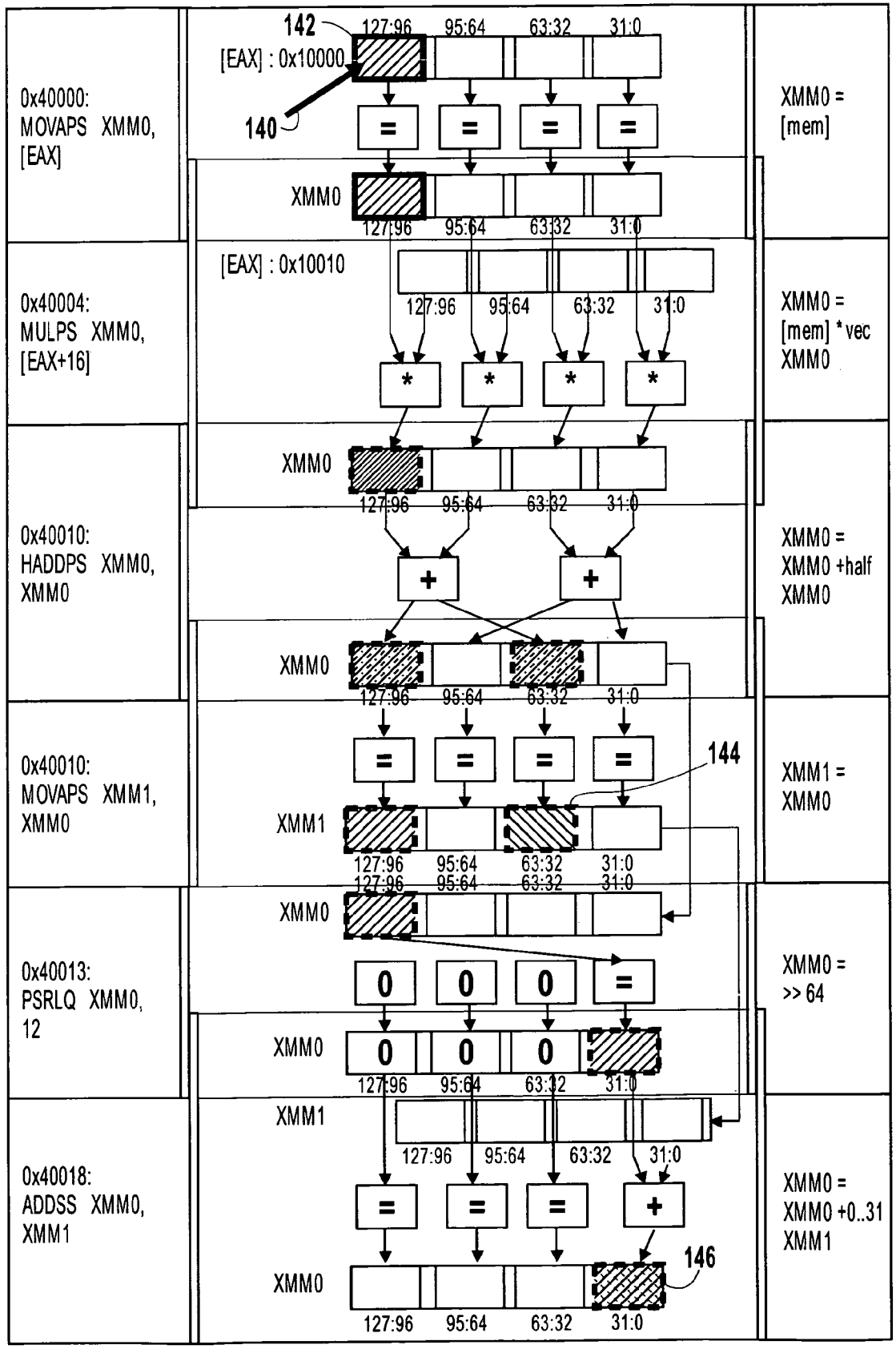

Since FIGS. 2 and 3 are in black and white, different fill patterns are used to represent the actual colors that would be displayed in the user interface, in one particular embodiment. Specifically, the following colors and combinations of color are represented by the following fill patterns:

| Color: | Fill Pattern |
| --- | --- |
| Red | medium solid lines at 45°. |
| Yellow | medium dash-dot lines at 45°. |
| Green | medium solid lines at 135°. |
| Blue | medium dash lines at 135°. |
| Light red | thin solid lines at 45°. |
| Light yellow | thin dash-dot lines at 45°. |
| Light green | thin solid lines at 135°. |
| Light blue | thin dash lines at 135°. |
| Red background with light red diagonal lines | interspersed thin and medium solid lines at 45°. |
| Yellow background with light yellow diagonal lines | interspersed thin and medium dash-dot lines at 45°. |
| Green background with light green diagonal lines | interspersed thin and medium solid lines at 135°. |
| Blue background with light blue diagonal lines | interspersed thin and medium dash lines at 135°. |
| Yellow background with red diagonal lines | medium solid lines at 45°, interspersed with medium dash-dot lines at 45°. |
| Green background with blue diagonal lines | medium solid lines at 135°, interspersed with medium dash lines at 135°. |
| Red background with light blue diagonal lines | medium solid lines at 45°, interspersed with medium dash lines at 135°. |

In addition, where a target operand from one instruction is used by the next instruction as a source operand, the rows for those two instructions may overlap. The thin vertical bars that constitute the left and right borders of the center column serve to indicate when the graphical representation for a row extends beyond the horizontal lines, to include source and/or target operands from one or more adjacent instructions. For purposes of this disclosure, target operands may also be referred to as output operands, and to source operands may also be referred to as input operands.

Thus, operand object 152, which is the left-most target operand object for the second instruction object, is red with light red diagonal lines. The red color in operand object 152 matches the red color in operand object 154, which is the leftmost target operand object for the first instruction object. Debug program 100 assigns the same colors to those two operand objects to show that the value of operand object 152 is based at least in part on the value of operand object 154. (Or, more precisely, the same colors are used to show that the values of the data items represented by those operand objects are related.) Similarly, the light red color in operand object 152 matches the color of operand object 156, which is one of the source operand objects for the second instruction object. Debug program 100 includes light red in operand object 152 to show that the value of operand object 152 is also based in part on the value of operand object 156.

Figure 4:
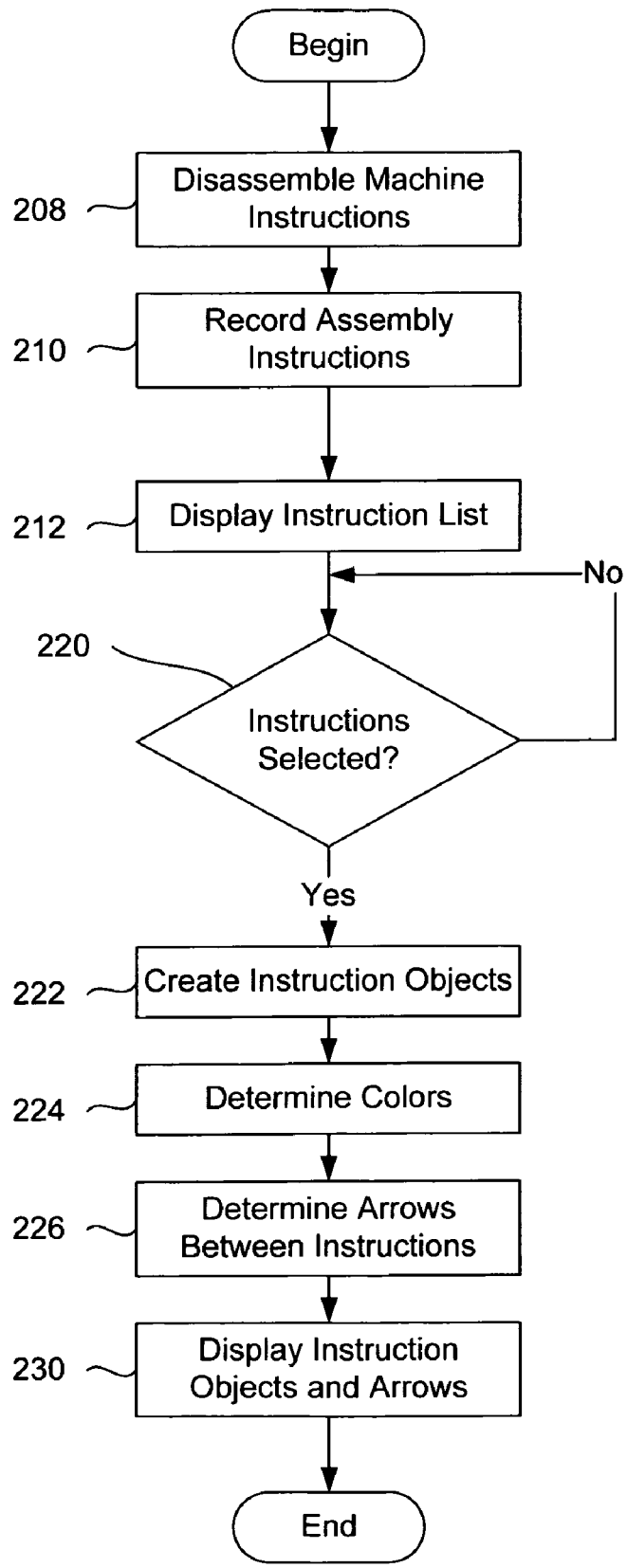
FIG. 4 is a flowchart of an example embodiment of a process for analyzing SIMD code in the processing system of FIG. 1.

FIG. 4 is a flowchart of an example embodiment of a process for analyzing SIMD code in the processing system of FIG. 1. This process may be performed by debug program 100. The process may begin with processing system 20 executing debug program 100 and target program 102. For instance, debug program 100 may have been configured to analyze all data coming from the address range used by target program 102 (e.g., based on a stream of bytes read from the code segment of the executable image of target program 100). As depicted at block 208, debug program 100 may parse all of the data that processor 24 retrieves from that address range to disassemble the machine instructions into assembly instructions. Debug program 100 stores the disassembled instructions into an instruction list, as shown in block 210.

As shown at block 212, debug program 100 may display a list of the assembly instructions. As depicted at block 220, debug program 100 may determine whether processing system 20 has received user input selecting a subset of the displayed instructions for analysis. As shown at block 220, if the user has selected a subset of the displayed instructions, debug program 100 may automatically create instruction objects to represent the selected instructions. Debug program 100 may create these instruction objects based on one or more of the following instruction characteristics: the opcode, the operation size, and the operands. As indicated above, the instruction objects may include operand objects, operator objects, and arrows connecting operand and operator objects.

In one embodiment, debug program 100 creates the instruction objects dynamically while target program 102 is executing. Alternatively, debug program 100 may create the instruction objects after target program 102 has stopped executing, based on a historical record of instruction execution.

As shown at block 224, debug program 100 may respond to selection of one or more assembly instructions by automatically determining appropriate colors for the operand objects in the instruction objects for the selected instructions. For instance, debug program 100 may automatically determine whether any data item in each SIMD instruction in the selected set of instructions is based on any data items in any previous SIMD instructions in the selected set. If the value of a first operand is based on or affected by the value of a second operand, the first operand may be referred to as a child operand or simply as a child, and the second operand may be referred to as a parent operand or parent.

In response to determining that a child is affected by a parent, debug program 100 may copy the color from the parent to child. In other words, in response to determining that a data item of SIMD instruction "N" is based at least in part on a data item from another instruction "M," debug program 100 may automatically assign the color from the pertinent data object for instruction "M" to the pertinent data object for instruction "N." Furthermore, in response to determining that a child is affected by multiple parents, debug program 100 may copy the colors from each of the parents to the child. Thus, a child operand object may include multiple colors from multiple parent operand objects.

In response to determining that an instruction performs a simple assignment from one or more source operands to one or more target operands, debug program 100 may assign new colors to the target operands. Debug program 100 may also assign new colors to the source operands of the first selected instruction. The new colors may be a set of default colors (e.g., red, yellow, green, and blue). In response to determining that an instruction assigns a constant value to a target data item or does not operate on a target data item at all, debug program 100 may automatically gray out (e.g., assign the color gray to) the data object representing that target data item.

As shown at block 226, debug program 100 may also automatically create additional arrows, to further illustrate relationships between the selected instructions. For instance, debug program 100 may create the arrow that connects one of the target operands from the third instruction object of FIG. 2 to one of the source operands in the fifth instruction object of FIG. 2. Debug program 100 may automatically create such arrows based at least in part on an analysis to determine which source operands are affected by which target operands, which source operands are used by multiple instructions, etc.

In an alternative embodiment, operation 226 may be performed before operation 224.

As indicated at block 230 of FIG. 3, debug program 100 may then display the instruction objects, including the colored operand objects and the arrows that were automatically created, to illustrate the relationships between the selected instructions.

Alternatively or in addition, debug program 100 may automatically determine whether a selected data item in a particular instruction affects any data items in any subsequent SIMD instructions in the selected set.

FIG. 3 is a diagram depicting another example presentation in a user interface. In particular, FIG. 3 shows that, if a user selects an operand in the user interface, debug program 100 may gray out all objects except for the operands that could affect the selected object or could be affected by the selected object. That is, debug program 100 may gray out all irrelevant operands. In addition, debug program 100 may add a noticeable border around the operands that affect the selected object or are affected by the selected object (i.e., the relevant operands). For instance, debug program 100 may add one type of border (e.g., black) to the selected operand and to any other relevant operand that would contain an unmodified version of the value of the selected operand, while adding a second type of border (e.g., black and yellow) to the relevant operands that could contain a modified version of the value of the selected operand, due to the applied operations. Debug program 100 thereby further helps people to understand how the instructions relate to each other, including how the data flows through the instructions.

For example, if the user clicks on operand object 142 with cursor 140, debug program 100 shows how the value of this field moves down the computation. Thus, FIG. 3 highlights a forward dataflow among the sequence of illustrated instructions. That is, debug program 100 may automatically highlight data objects in the user interface that are fed by the selected data object, according to data flow among data items corresponding to the data objects to be highlighted. For instance, debug program 100 may add a border to operand objects that are relevant to operand object 140, including operand objects 144 and 146, and debug program 100 may gray out the irrelevant data objects.

The resulting presentation may help the user to understand the dataflow. For instance the user may notice that operand object 144 in the fourth row does not feed into any other operand objects, while the intended operation of target program 102 would require the value from that operand object to be used. Debug program 100 may thereby assist in debugging target program 102. Similarly, the user may know that target program 102 is computing an incorrect value for data object 146 in the sixth row, and the presentation in FIG. 3 may make it easier for the user to figure out which operands or which operators may be causing the incorrect value.

Debug program 100 may also support reverse dataflow analysis. For instance, if a user were to select data object 146, debug program 100 could highlight all of the data objects that feed into the selected data object, using colors, borders, and grayed out objects, as described herein with regard to the forward dataflow analysis.

Figure 5:
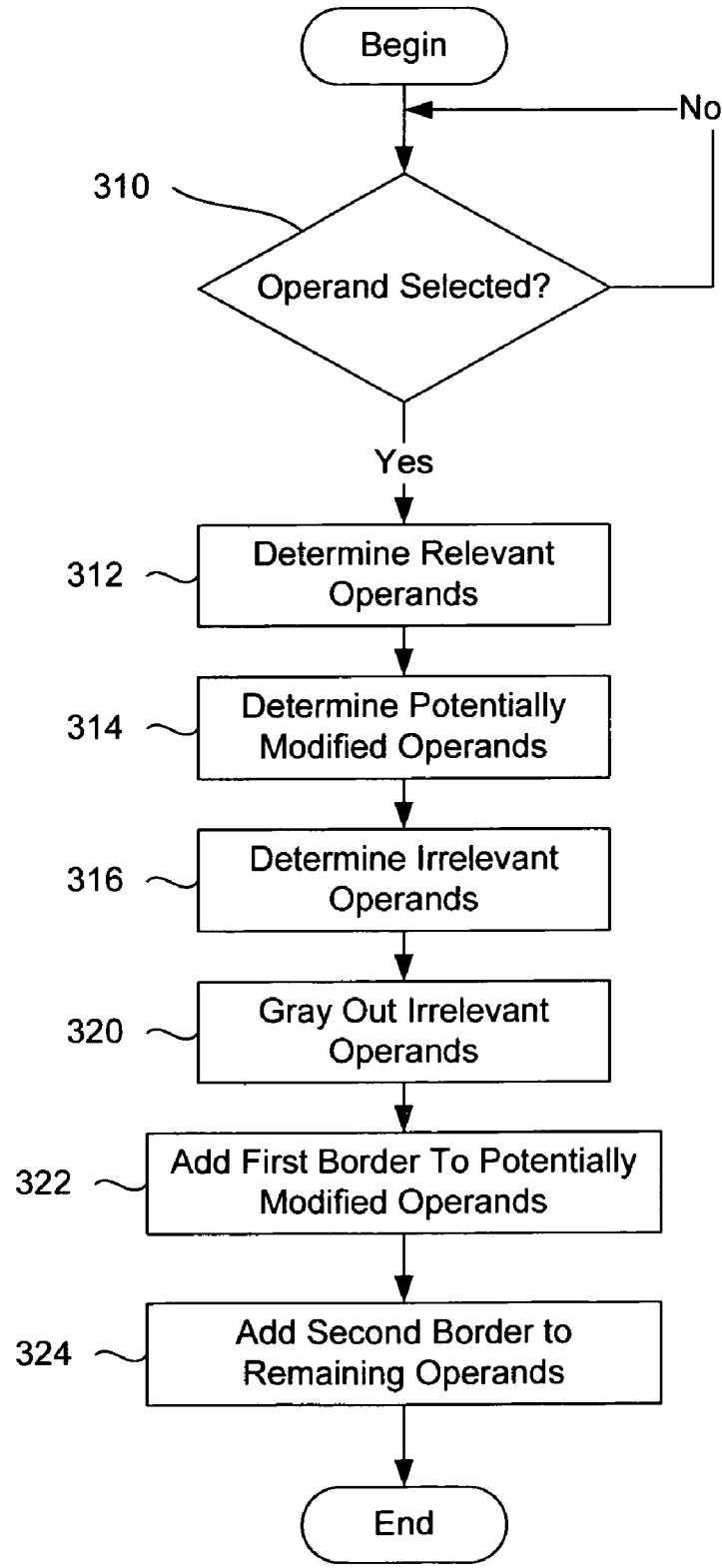
FIG. 5 is a flowchart of an example embodiment of another process for analyzing SIMD code in the processing system of FIG. 1.

FIG. 5 is a flowchart of an example embodiment of a process for highlighting a relevant subset of data objects within a displayed set of instruction objects. The illustrated process may begin after debug program 100 has presented the user interface of FIG. 2. As indicated at block 310, debug program 100 may then determine whether the user has selected an operand object. As shown at block 312, in response to the user selecting an operand object, debug program 100 may determine which other operands are relevant to the selected operand. For instance, referring again to FIG. 3, debug program 100 may make these kinds of determinations in response to the user selecting operand object 142.

As indicated at block 314, debug program 100 may also determine which of the relevant operands would include unmodified versions of the value of the selected operand, and which could include modified versions of that value. As shown at block 316, debug program 100 may then classify the remaining operands as irrelevant. As shown at block 320, debug program 100 may then gray out the irrelevant operand objects. Debug program 100 may also add a first border to the operand objects for the operands that could include modified versions of the value of the selected operand, as shown at block 322. As indicated block 324, debug program 100 may add a different border to the remaining operands (i.e., the relevant operands that would contain unmodified copies of the value from the selected operand).

Thus, as has been described, debug program 100 supplies a graphical method to visualize an instruction stream using the actual context and the dynamic state of the application as part of an interactive disassembly tool. Debug program 100 may provide these benefits by combining techniques for visualizing data flows with algorithms and functionalities for disassembling machine instructions.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine accessible media encoding instructions for performing the operations of the invention. Such embodiments may also be referred to as program products. Such machine accessible media may include, without limitation, storage media such as floppy disks, hard disks, CD-ROMs, ROM, and RAM; and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. The control logic for providing the functionality described and illustrated herein may be implemented as hardware, software, or combinations of hardware and software in different embodiments. For instance, one or more modules, subsystems, etc., in one or more devices may be implemented as embedded controllers, using components such as programmable or non-programmable logic devices or arrays, application-specific integrated circuits (ASICs), embedded processors, smart cards, and the like.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers, workstations, servers, portable computers, laptop computers, tablets, telephones, personal digital assistants (PDAs), handheld devices, entertainment devices such as audio and/or video devices, and other platforms or devices for processing or transmitting information.

In view of the wide variety of useful permutations that may be readily derived from the example embodiments described herein, this detailed description is intended to be illustrative only, and should not be taken as limiting the scope of the invention. What is claimed as the invention, therefore, is each implementation that comes within the scope and spirit of the following claims, and all equivalents to such implementations.

What is claimed is:

1. A processing system-implemented method for analyzing computer instructions, comprising:
    disassembling, by a processing system, a stream of machine instructions into a stream of assembly language instructions, wherein the stream of assembly language instructions comprises single instruction, multiple data (SIMD) instructions involving multiple data items;
    automatically creating, by the processing system, an instruction object "M" to represent a SIMD instruction "M" from the SIMD instructions involving multiple data items, and automatically creating an instruction object "N" to represent a SIMD instruction "N" from the SIMD instructions involving multiple data items, wherein instruction objects "M" and "N" each comprises (a) multiple data objects corresponding to the multiple data items of the respective SIMD instruction and (b) at least one operator object corresponding to an operation of the respective SIMD instruction;
    automatically assigning, by the processing system, different visual characteristics to at least two of the multiple data objects of instruction object "M";
    automatically determining, by the processing system, whether any data items of SIMD instruction "N" are affected by any data items of SIMD instruction "M";
    in response to determining that a particular data item of SIMD instruction "N" is affected by a source data item of SIMD instruction "M", automatically assigning, by the processing system, a visual characteristic assigned to a source object to a target object, wherein the source object is the data object of instruction object "M" that corresponds to the source data item, and the target object is the data object of instruction object "N" that corresponds to the particular data item; and
    presenting, by the processing system, in a user interface, visual representations of data objects of instruction objects "M" and "N" with visual characteristics assigned to the data objects.

2. The processing system-implemented method according to claim 1, further comprising:
    automatically determining, by the processing system, whether data in a target data item is based at least in part on first and second data items; and
    in response to determining that data in the target data item is based at least in part on the first and second data items, assigning, by the processing system, multiple visual characteristics to a single data object corresponding to the target data item, wherein the multiple visual characteristics comprise (a) a visual characteristic assigned to a data object corresponding to the first data item and (b) a visual characteristic assigned to a data object corresponding to the second data item.

3. The processing system-implemented method according to claim 1, further comprising:
in the user interface, displaying, by the processing system, arrows between source data objects and operator objects, and between operator objects and target data objects, to illustrate data flow among data items.

4. The processing system-implemented method according to claim 1, further comprising:
automatically determining, by the processing system, a type of operation and an operation size for SIMD instruction "M";
automatically creating, by the processing system, instruction object "M", based at least in part on the type of operation and operation size for SIMD instruction "M"; and
generating, by the Processing system, an abbreviated description of the operation, based at least in part on the type of operation and operation size for SIMD instruction "M".

5. The processing system-implemented method according to claim 1, further comprising:
automatically determining, by the processing system, whether a SIMD instruction "O" from the SIMD instructions involving multiple data items is an assignment instruction to assign values from source data items to target data items; and
in response to determining that SIMD instruction "O" is an assignment instruction, automatically assigning, by the processing system, new visual characteristics to data objects representing the target data items.

6. The processing system-implemented method according to claim 1, further comprising:
automatically determining by the processing system whether a SIMD instruction "P" from the SIMD instructions involving multiple data items assigns a constant value to a target data item; and
in response to determining that SIMD instruction "P" assigns the constant value to the target data item, automatically visually deemphasizing, by the processing system, in the user interface, a data object representing the target data item.

7. The processing system-implemented method according to claim 6, further comprising:
automatically determining, by the processing system whether SIMD instruction "P" does not operate on the target data item; and
in response to determining that SIMD instruction "P" does not operate on the target data item, automatically visually deemphasizing, by the processing system, in the user interface, a data object representing the target data item.

8. The processing system-implemented method according to claim 1, wherein the instruction objects are created dynamically during execution of the stream of machine instructions.

9. The processing system-implemented method according to claim 1, wherein the instruction objects are created based on a historical record of execution of the stream of machine instructions.

10. The processing system-implemented method according to claim 1, further comprising:
displaying, by the processing system, a sequence of instruction objects in the user interface;
receiving, by the processing system, user input selecting a data object within an instruction object among the displayed sequence of instruction objects; and
in response to the user input, automatically highlighting, by the processing system, a reverse data flow among the sequence of instructions in the user interface;
wherein the operation of automatically highlighting the reverse data flow comprises automatically highlighting data objects in the user interface that feed in to the selected data object, according to data flow among data items corresponding to the data objects to be highlighted.

11. The processing system-implemented method according to claim 1, further comprising:
displaying, by the processing system, a sequence of instruction objects in a user interface;
receiving, by the processing system, user input selecting a data object within an instruction object among the displayed sequence of instruction objects; and
in response to the user input, automatically highlighting, by the processing system, a forward data flow among the sequence of instructions in the user interface;
wherein the operation of automatically highlighting the forward data flow comprises automatically highlighting data objects in the user interface that are fed by the selected data object, according to data flow among data items corresponding to the data objects to be highlighted.

12. A processing system for executing instructions and for analyzing those instructions, the processing system comprising:
a processor;
a user interface; and
control logic configured to:
disassemble a stream of machine instructions into a stream of assembly language instructions, wherein the stream of assembly language instructions comprises single instruction, multiple data (SIMD) instructions that involve multiple data items;
automatically create an instruction object "M" to represent a SIMD instruction "M" from the SIMD instructions that involve multiple data items, and automatically create an instruction object "N" to represent a SIMD instruction "N" from the SIMD instructions that involve multiple data items, wherein instruction objects "M" and "N" each comprises (a) multiple data objects corresponding to the multiple data items of the respective SIMD instruction and (b) at least one operator object corresponding to an operation of the respective SIMD instruction;
automatically assign different colors to at least two of the multiple data objects of instruction object "M";
automatically determine whether any data items of SIMD instruction "N" are affected by any data items of SIMD instruction "M";
in response to a determination that a particular data item of SIMD instruction "N" is affected by a source data item of SIMD instruction "M", automatically assign a color assigned to a source object to a target object, wherein the source object is the data object of instruction object "M" that corresponds to the source data item, and the target object is the data object of instruction object "N" that corresponds to the particular data item; and
present, in the user interface, visual representations of data objects of instruction objects "M" and "N" with visual characteristics assigned to the data objects.

13. The processing system according to claim 12, wherein the control logic is further configured to:
- automatically determine whether data in a target data item is based at least in part on first and second data items; and
- in response to a determination that data in the target data item is based at least in part on the first and second data items, assign multiple colors to a single data object corresponding to the target data item, wherein the multiple colors comprise (a) the color of a data object corresponding to the first data item and (b) the color of the a data object corresponding to the second data item.

14. The processing system according to claim 12, wherein the control logic is further configured to:
- in the user interface, display arrows between source data objects and operator objects, and between operator objects and target data objects, to illustrate data flow among data items.

15. The processing system according to claim 12, wherein the control logic is further configured to
- automatically determine whether a SIMD instruction "O" from the SIMD instructions that involve multiple data items is an assignment instruction to assign a value from a source data item to the target data item; and
- in response to a determination that SIMD instruction "O" is an assignment instruction, automatically assign a new color to a data object representing the target data item.

16. The processing system according to claim 12, wherein the control logic is further configured to:
- automatically determine whether a SIMD instruction "P" from the SIMD instructions that involve multiple data items assigns a constant value to a target data item; and
- in response to a determination that SIMD instruction "P" assigns the constant value to the target data item, automatically visually deemphasize, in the user interface, a data object representing the target data item.

17. The processing system according to claim 16, wherein the control logic is further configured to:
- automatically determine whether SIMD instruction "P" does not operate on the target data item; and
- in response to a determination that SIMD instruction "P" does not operate on the target data item, automatically visually deemphasize, in the user interface, a data object representing the target data item.

18. The processing system according to claim 12, wherein the instruction objects are created dynamically during execution of the stream of machine instructions.

19. The processing system according to claim 12, wherein the control logic is further configured to:
- display a sequence of instruction objects in the user interface;
- receive user input selecting a data object within an instruction object among the displayed sequence of instruction objects; and
- in response to the user input, automatically highlight a reverse data flow among the sequence of instructions in the user interface;
- wherein the operation of automatically highlight the reverse data flow comprises automatically highlight data objects in the user interface that feed in to the selected data object, according to data flow among data items corresponding to the data objects to be highlighted.

20. The processing system according to claim 12, wherein the control logic is further configured to:
- display a sequence of instruction objects in the user interface;
- receive user input selecting a data object within an instruction object among the displayed sequence of instruction objects; and
- in response to the user input, automatically highlight a forward data flow among the sequence of instructions in the user interface;
- wherein the operation of automatically highlight the forward data flow comprises automatically highlight data objects in the user interface that are fed by the selected data object, according to data flow among data items corresponding to the data objects to be highlighted.

21. An article of manufacture, comprising:
a non-transitory machine-accessible medium; and
instructions in the non-transitory machine-accessible medium, wherein the instructions, responsive to execution by a processing system, cause the processing system to:
- disassemble a stream of machine instructions into a stream of assembly language instructions, wherein the stream of assembly language instructions comprises single instruction, multiple data (SIMD) instructions that involve multiple data items;
- automatically create an instruction object "M" to represent a SIMD instruction "M" from the SIMD instructions that involve multiple data items, and automatically creating an instruction object "N" to represent a SIMD instruction "N" from the SIMD instructions that involve multiple data items, wherein instruction objects "M" and "N" each comprises (a) multiple data objects corresponding to the multiple data items of the respective SIMD instruction and (b) at least one operator object corresponding to an operation of the respective SIMD instruction;
- automatically assign different visual characteristics to at least two of the multiple data objects of instruction object "M";
- automatically determine whether any data items of SIMD instruction "N" are affected by any data items of SIMD instruction "M";
- in response to a determination that a particular data item of SIMD instruction "N" is affected by source data item of SIMD instruction "M", automatically assign a visual characteristic assigned to a source object to a target object, wherein the source object is the data object of instruction object "M" that corresponds to the source data item, and the target object is the data object of instruction object "N" that corresponds to the particular data item; and
- present, in a user interface, visual representations of data objects of instruction objects "M" and "N" with visual characteristics assigned to the data objects.

22. The article according to claim 21, wherein the instructions, responsive to execution by the processing system, further enable the processing system to:
- automatically determine whether data in a target data item is based at east in part on first and second data items; and
- in response to a determination that data in the target data item is based at least in part on the first and second data items, assign multiple visual characteristics to a single data object corresponding to the target data item, wherein the multiple visual characteristics comprise (a) a color of a data object corresponding to the first data item and (b) a color of the a data object corresponding to the second data item.

23. The article according to claim 21, wherein the instructions, responsive to execution by the processing system, further enable the processing system to:

in the user interface, display arrows between source data objects and operator objects, and between operator objects and target data objects, to illustrate data flow among data items.

24. The article according to claim 21, wherein the instructions, responsive to execution by the processing system, further enable the processing system to:
   automatically determine whether a SIMD instruction "O" from the SIMD instructions that involve multiple data items is an assignment instruction to assign a value from a source data item to the target data item; and
   in response to a determination that that SIMD instruction "O" is an assignment instruction, automatically assign a new visual characteristic to a data object representing the target data item.

25. The article according to claim 21, wherein the instructions responsive to execution by the processing system, further enable the processing system to:
   automatically determine whether a SIMD instruction "P" from the SIMD instructions that involve multiple data items assigns a constant value to a target data item; and
   in response to a determination that that SIMD instruction "P" assigns the constant value to the target data item, automatically visually deemphasize, in the user interface, a data object representing the target data item.

26. The article according to claim 21, wherein the instruction objects are created dynamically during execution of the stream of machine instructions.

27. The article according to claim 21, wherein the instructions, responsive to execution by the processing system, further enable the processing system to:
   display a sequence of instruction objects in the user interface;
   receive user input selecting a data object within an instruction object among the displayed sequence of instruction objects; and
   in response to the user input, automatically highlight a reverse data flow among the sequence of instructions in the user interface;
   wherein the operation of automatically highlight the reverse data flow comprises automatically highlight data objects in the user interface that feed in to the selected data object, according to data flow among data items corresponding to the data objects to be highlighted.

28. The article according to claim 21, wherein the instructions, responsive to execution by the processing system, further enable the processing system to:
   display a sequence of instruction objects in the user interface;
   receive user input selecting a data object within an instruction object among the displayed sequence of instruction objects; and
   in response to the user input, automatically highlight a forward data flow among the sequence of instructions in the user interface;
   wherein the operation of automatically highlight the forward data flow comprises automatically highlight data objects in the user interface that are fed by the selected data object, according to data flow among data items corresponding to the data objects to be highlighted.

* * * * *